3,510,581
OPTIMUM POSTDETECTION FILTER FOR MICROWAVE RADIOMETRIC MAPPING SYSTEM

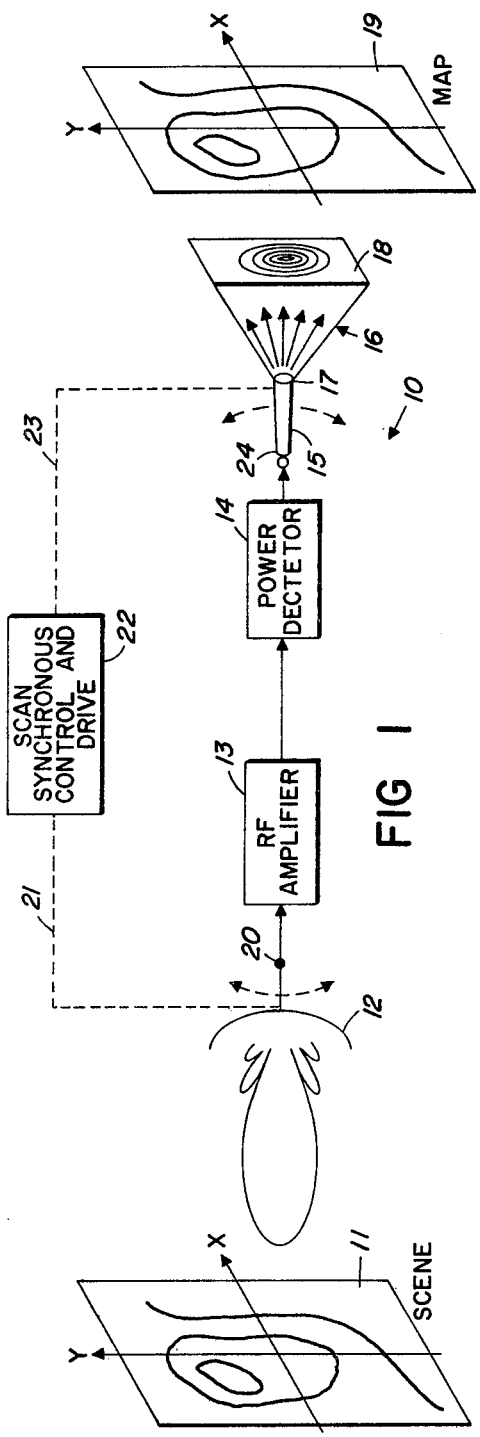
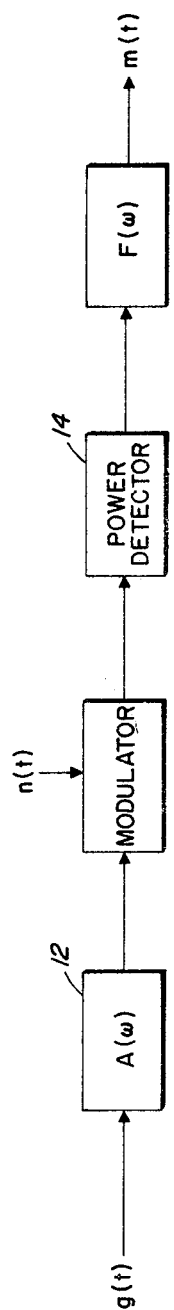

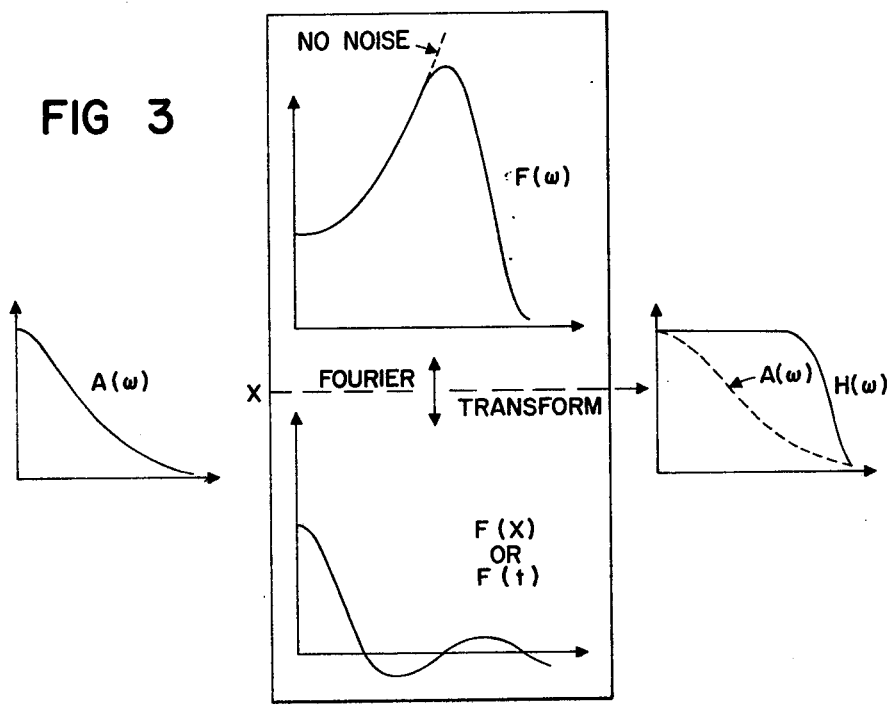
FIG 3
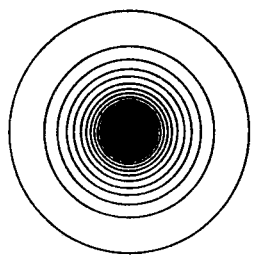
FIG 4
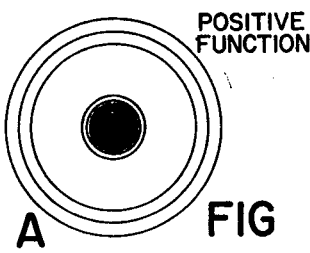
FIG 6
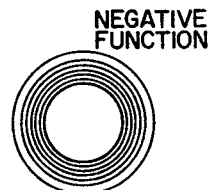
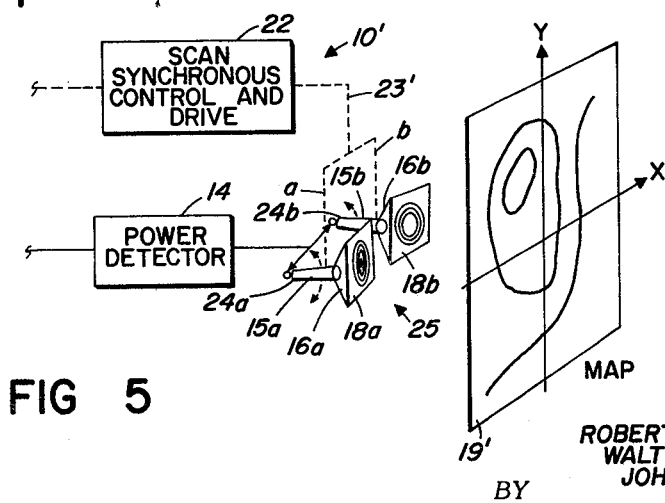
FIG 5

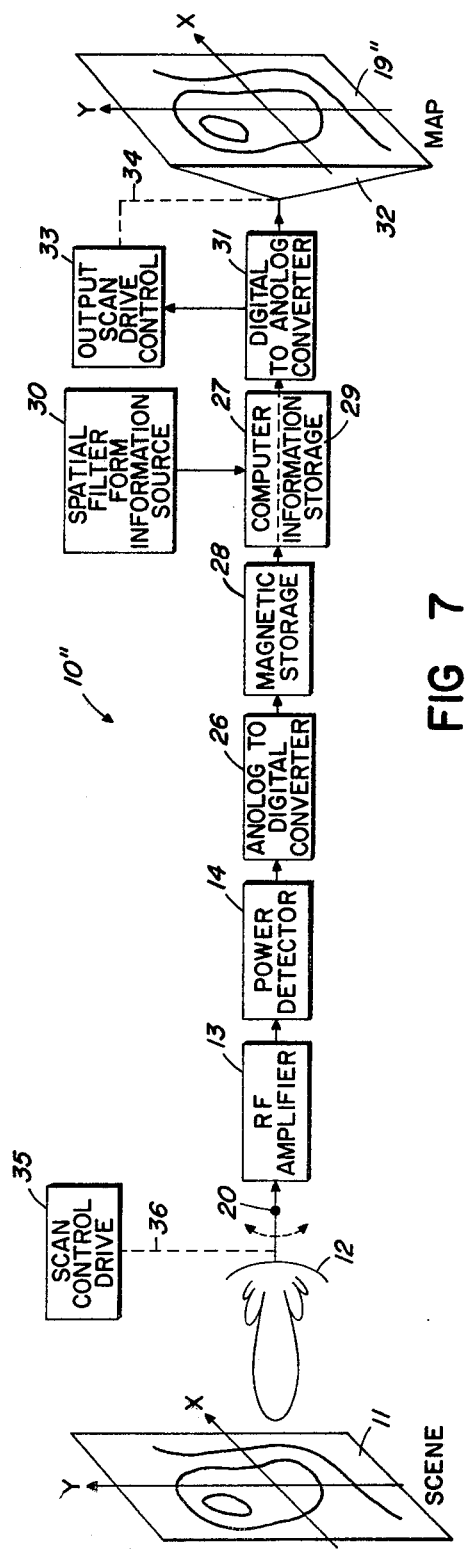

Robert L. Craiglow, John M. Holt, and Walter R. Iliff, Cedar Rapids, Iowa, assignors to Collins Radio Company, Cedar Rapids, Iowa, a corporation of Iowa
Filed July 1, 1966, Ser. No. 562,212
Int. Cl. H04n 7/18, 7/02
U.S. Cl. 178—6         18 Claims

ABSTRACT OF THE DISCLOSURE

Postdetection spatial filtering for microwave radiometric mapping systems is involved. It incorporates real time spatial filtering after detection in the recording process to minimize spatial frequency distortion and loss of detail inherently present and characteristically determined by the specific scene scanning antenna employed.

---

This invention relates in general to passive radio frequency detection and map reproducing systems, and in particular, to a microwave radiometric mapping system with optimized postdetection filtering and mapping.

Mapping of terrestrial radiation is an area of prime interest dealt with specifically in the following specification. It should be noted, however, that various problems encountered and the problem solutions employed are also applicable in systems employed for mapping of celestial radiation, and in certain radar applications. The techniques employed are also certainly applicable, at least to some extent, with photofacsimile transmission and with television receivers. In the mapping of terrestrial radiation, scanning antennas, regardless of design, inherently tend to smooth or filter the observed surface temperature distribution sensed for mapping through the system. This scanning antenna smoothing or filtering action actually imposes a rather severe limitation on the available angular resolution of such systems in the microwave region. One way to obtain some improvement in resolution is by construction or synthesis of large antenna aperture structures, a move which can be both expensive and objectionable with respect to size, weight and complexity, and particularly so in airborne systems. An alternate approach to solving some of the problems is to provide a system giving recovery of lost angular detail, with the use of a relatively small antenna, through the use of a postdetection inverse filter system capable of partially undoing the effects of antenna smoothing. Use of snch a postdetection filter technique results in a broadening of the system information bandwidth or an increase in equivalent angular resolution. It should be noted that an increase in the system information bandwidth attained through the use of relatively small microwave antenna and receiver systems results in an increase in output noise level. However, continual improvements in the figure of merit of microwave receivers favor such a trade-off. The postdetection filter approach employed is, for many applications, a particularly interesting improvement over various conventional techniques that are limited to reducing noise level at the expense of angular resolution, as obtained with long-time constant filters. This new postdetection filter method may, at least to some extent, be considered analogous to peaking filters as employed for one direction in television video amplifiers.

It is, therefore, a principal object of this invention to provide compensation in a microwave radiometric mapping system to optimize antenna performance to the highest degree available.

A further object is to provide such optimization of antenna and system performance through use of a postdetection two-dimensional spatial filtering system.

Another object with such a two-dimensional spatial postdetection filtering approach, for some embodiments and desired operational results, is to provide both addition and subtraction of image intensity information in compensating for the specific filter function operational distortion characteristics of a particular receiving antenna configuration used.

Still another object is to provide some measure of control of map noise and to eliminate scan line effects in the map through the use of postdetection spatial filtering.

Features of this invention useful in accomplishing the above objects will become more apparent with a further understanding of radiometric mapping. Simply stated, radiometric mapping is the translation of information contained in the thermal radiation properties of surfaces to a visible record of information on a display surface. The thermal information is generally three-dimensional, although in some cases it may be approximately two-dimensional (for example, the surface of the earth from an altitude of 100,000 feet). The display is frequently a two-dimensional picture or map of the object distribution, and if often called a radiograph. The map may display information sensed in angular coordinance on a rectangular grid producing distortion in the map and information is invariably lost in the translation process. Obviously, in order to optimize the desired mapping results, the loss of desired information must be minimized. The desired information is sometimes the complete thermal distribution in the mapped area or it may be the recognition of surfaces of particular sizes, shapes, or thermal characteristics. In contrast to radar, correct infomation on the range of objects is lacking, but the direct advantage of passive operation and the resulting absence of back scatter transmitter power in the presence of precipitation compensate for this lack where range data is not an essential requirement. Just as in photography, with natural vision, or television, the three-dimensional distribution of objects is viewed by a sensing element, as a two-dimensional scene, left, right and up and down, for example. In contrast to natural vision and photography, the electromagnetic energy received by the sensing element is focused upon a single detector so that a scanning process is required to generate the map. In the recorder section of the system, detected electrical energy is usually transduced to light energy for photographic recording, although it may be recorded directly on electrosensitive surfaces. In one embodiment of the invention, the recording element is scanned over the mapping surface in synchronism with the sensing element, whereas in some other approaches, the recording element scan is delayed for the completion of a complete frame scan of the input before the corresponding read-out printing or map display scan is commenced. Both the elements, the sensing element, an antenna for example, and the recording element have directional patterns, that is, they apply two-dimensional or spatial weighted functions in sensing the scene and recording the map. Thus, they both have a significant filtering effect in the translation of information from the scene or ground, as the case may be, to the map display. Noise and sensor smoothing imparted by the antenna sensor are counteracted to a significant degree by two-dimensional spatial postdetection filtering of information being processed to the final information result and display devices.

To summarize, the effect of a scanning antenna beam is to smooth or filter the surface temperature distribution in a radio mapping system, an effect which may be partially overcome or compensated for by use of properly designed postdetection filters with respect to the particular sensing antenna used, partially undoing antenna smoothing and thereby permitting recovery of lost detail. This is equivalent to increasing the angular resolving power of the system or, stated another way, the result is that the information bandwidth of the system is broadened to thereby yield greater fidelity in the output.

An important embodiment of the invention features the use of post-detection two-dimensional spatial filter transparencies in the photographic recording of radiometric data. The spatial form of such filter transparencies is related to the Fourier transform of the frequency response of the original filter, i.e., the sensing antenna, which can be interpreted as its impulsive response. This is implemented, for example, by such a postdetection spatial filter transparency shaping a light beam to form an image and to modulate the intensity of the thereby shaped beam with the radiometric signal as smoothed by the sensing antenna throughout its scanning action. Scanning the resulting light beam appropriately shaped and modulated across a photographic emulsion acting as an integrator effectively recovers detail obscured, but not completely removed by the antenna filtering.

Specific embodiments representing what are presently regarded as the best modes for carrying out the invention are illustrated in the accompanying drawings.

In the drawings:

FIG. 1 represents a combination block and symbolic showing of a microwave radiometric mapping system from a ground or scene radiating source through a sensing antenna, a radiometric signal amplifier, a detector, a modulated light source, optical lens and spatial filter transparency assembly to, ultimately, a display map of the initial ground scene X–Y distribution;

FIG. 2, a basic mathematical function model block diagram associated with a system such as illustrated in FIG. 1;

FIG. 3, an illustration showing how the bandwidth of the system is increased by pictorially tying together the equivalent antenna filter function $A(\omega)$, where a particular antenna pattern has a gaussian spatial distribution and, therefore, a gaussian frequency distribution, in multiplication with the general form of the optimum filter function $F(\omega)$, in a noisy system as indicated in the upper section of the middle Fourier transform portion of the figure (the lower Fourier transform section illustrates graphically the function $F(x)$ or $F(t)$) to together give a broadened total system response $H(\omega)$ that is broadened relative to the originating $A(\omega)$ function for trade-off control between noise and the effective angular resolution in the system;

FIG. 4, a showing of the gaussian function filter effect distribution obtained with a typical sensing antenna such as may be employed in the embodiment of FIG. 1 and may be used in the form of a transparency for postdetection filtering and thereby as a trade-off control between noise and resolution.

FIG. 5, a partial combination block and symbolic showing of a microwave radiometric mapping system similar in many respects to the embodiment of FIG. 1 with, however, bipolar postdetection filtering including two lamps and filter transparency assemblies, with one filter a positive function filter transparency and the other a negative function filter transparency;

FIG. 6, A and B, respectively, a positive function filter transparency and a negative function filter transparency, such as may be used in the embodiment of FIG. 5, for improved postdetection filtering and mapping results for an antenna having a gaussian function filtering distribution effect such as indicated in FIG. 4; and, FIG. 7, a combination block and symbolic showing utilizing a computer having a spatial filter form signal input for applying a postdetection spatial filtering function to scanned scene input frames and ultimately providing a postdetection filtered read-out or map display as desired.

Referring to the drawings:

The microwave radiometric mapping system 10 of FIG. 1 is shown to be scanning and sensing a ground scene temperature distribution two-dimensional X–Y frame 11 with a microwave radiometric sensing antenna 12 that may be any one of various conventional antenna configurations having an appropriate antenna pattern for the intended use. Signaling sensed by the antenna 12 is passed as an input to an RF amplifier 13 with an output connection as an input to a power detector 14 that is a square law detector in some embodiments. The output of power detector 14 is applied as a modulating input to a modulated light source 15 of the modulated light source, optical lens, and spatial filter transparency assembly 16. The light rays passed through lens 17 of this assembly impinge upon and partially pass through spatial filter transparency 18 with the light rays passed ultimately impinging upon a display surface. While this surface may be like the viewing face of a cathode ray tube, having time delay image integrating characteristics, a sheet of photosensitive emulsion or like substance is used in the embodiment of FIG. 1 to develop a map 19 duplicating, in the two-dimensional X–Y sense, the initially scanned earth scene temperature distribution 11. A universal joint pivot mount 20 provides for two-dimensional X–Y scanning movement of antenna 12 as driven through mechanical drive 21 from scan synchronous control and drive 22 also equipped with a scanning drive connection through drive line 23 for scan synchronous control drive of the modulated light source optical lens and spatial filter transparency assembly 16 about its universal joint pivot mount 24.

In an operational embodiment such as that of FIG. 1 where the modulated light output of light source 15 is transferred to a photograph emulsion through a predetermined exposure pattern, as projected by an optical lens assembly 17 and through filter transparency 18, it is important that error in the system be minimized. The mean squared error of the system is $e^2(x,y)$ with $e(x,y) = m(x,y) - g(x,y)$ with $m$ being the resulting map and $g$ being the ground scene surveyed. Referring also to FIG. 2, mathematically, $g(x,y)$ becomes a time variable $g(t)$ function through the scanning mechanism. However, the sensing antenna output is the $g(t)$ factor as smoothed by a filter $A(\omega)$ function equivalent to the antenna action. In effect the smoothed $g(t)$ modulates a band limited gaussian noise function, $n(t)$ and the resulting function is detected and processed by a postdetection filter, $F(\omega)$ to produce a resulting output function $m(t)$. Heretofore, a conventional approach for the implementation of the $F(\omega)$ function has been through the use of RC filtering with high frequency cutoff designed to adequately limit system noise without undue degradation of angular resolution. Further, this generally has been accomplished without seriously narrowing system response as determined by the filtering $A(\omega)$ effect of the sensing antenna. It is important, however, and an improvement over pre-existing techniques that the $F(\omega)$ function be simultaneously employed as a control function with respect to both thermal and angular resolution. This new technique advantageously minimizes the rms error between the map, $m(x,y)$ and the ground, $g(x,y)$, with both angular and thermal performance function measures combined. This total performance measure improving approach is accomplished in large measure by minimizing the expected value of the square of the error $e(x,y)$ and permits a closed mathematical solution approach in the attainment of optimum design for the postdetection filtering system providing optimized $F(\omega)$ function results.

Referring now to the function relation pictorial showing of FIG. 3, the equivalent filter function $A(\omega)$ of sensing antenna 12 is that of an antenna so selected that it may be assumed that the antenna pattern has a gaussian spatial distribution, and, therefore, a gaussian frequency distribution. This $A(\omega)$ function is shown as being multiplied with the frequency response $F(\omega)$ of an optimum filter in the Fourier transform form in the upper portion showing of an optimum filter function, in a noisy system. It should be noted that in the absence of system noise, $F(\omega)$ would simply be the reciprocal of the function $A(\omega)$. The effect of $F(\omega)$ is to broaden the total system response, $H(\omega)$, or that of the function $A(\omega)$, to thereby increase the effective angular resolution in the system. As a practical matter, the fabrication of an electrical filter with the required frequency response and no phase distortion, would be quite difficult, if not impossible, and if attainable, would result in a recovery of lost detail only along the scan axis. However, the Fourier transform of $F(\omega)$ is the impulsive or spatial equivalent of $F(\omega)$. By recording the map distribution with a light beam having a symmetrical pattern defined by the spatial transform $F(x)$ such as obtained by appropriate postdetection spatial transparency filtering not only is implementation greatly simplified over some approaches, but angular resolution may be increased in both dimensions simultaneously. Please note that while the transform has negative portions, it is possible, under some circumstances, that the level may be shifted to positive regions for convenience in the photographic process and to limit filter transparency numerical requirements to one spatial filter transparency. The accomplishment of the simultaneous improvements in a workable implementation requires considerable overlap between successive scans.

With the system embodiment described hereinbefore, the effective increase in angular resolution in each dimension is proportional to the increase in one dimensional bandwidth. In the analysis, the dependence of the optimum filter upon sweep rate, radiometric system merit figure and ground distribution statistics, was incorporated into a single parameter factor K. Small values of K represent slow sweep rates, high figures of merit and high ground contrast. Thus, the gain in angular resolution obtained with the optimum filter depends upon the parameter K as does the form of the optimum filter. In considering the variation of angular and thermal resolution for optimum filtering as the function of K, the one dimensional angular resolution is proportional to the normalized information bandwidth. Further, the two-dimensional angular or spatial resolution is proportional to the information bandwidth factor squared. The factor $\Delta T$, output noise fluctuations or thermal resolution, has been normalized by its asymptotic value as the K factor approaches infinity. To illustrate the tradeoff, by example, note that when K is equal to $10^{-2}$ the bandwidth factor is about 2.5, the bandwidth factor squared is 6.5, and $\Delta T$ is 10. Further, it is important to note for comparison that with a given area to be mapped per unit time, a real increase in angular resolution by a factor of 2.5 due to increased antenna aperture would require a shortening of system integration time by a factor of about 6.5 which in turn would increase $\Delta T$ by a factor of 2.5.

The gaussian function filter effect distribution illustrated in FIG. 4 is the distribution that may be obtained with the smoothing action of a typical sensing antenna 12 used in the embodiment of FIG. 1. This gaussian function distribution may be used in the form of a transparency for postdetection filtering as transparency 18 to thereby act as a tradeoff control between noise and resolution particularly where noise is a significant factor. Conversely, a combined positive and negative function spatial transparency may be employed as transparency 18 in some embodiments of the FIG. 1 system where noise is of less import either in intensity and/or with respect to intended system use for optimizing resolution.

Referring now to the embodiment of FIG. 5, most of microwave radiometric mapping system 10' is substantially the same as that of FIG. 1 with certain exceptions and that, therefore, those portions dupilcating those of the FIG. 1 system are either not shown or numbered the same. The particularly significant difference of the FIG. 5 embodiment over the other embodiment is that two modulated light source, optical lens and spatial filter transparency assemblies are used in place of one such assembly, with one of these assemblies being a positive function spatial filtering assembly 16A and the other a negative function spatial filter assembly 16B employing, respectively, spatial filter transparencies 18A and 18B such as the positive function transparency A and the negative function transparency B of FIG. 6. Branches a and b of the drive line 23' from scan synchronous control drive 22 are connected to the respective modulated light source, optical lens, and spatial filter transparency assemblies 16a and 16b so that they may be simultaneously driven in a coordinated scanning motion about their respective universal joint pivot mounts 24a and 24b. Herschel effect film (Kodak Autopositive, for example) is used with this bipolar postdetection spatial filtering system 25 with light source 24a being a blue zone white light for positive function spatial filtering through positive function filter 18a and adding density in the film image, and with light source 24b being a yellow light source for reducing density in the film as passed by filtering action through negative function filter 18b to the film for ultimately developing map 19' after each map scan frame is complete. A related embodiment utilizing the bipolar spatial filtering approach would employ an electrostatic image density adding and subtract implementation for producing the map print-out upon completion of each scan frame in place of Herschel effect film photographic emulsion sheet map prints.

In the embodiment of FIG. 7, a computerized approach is employed in place of the postdetection spatial filtering systems hereinbefore discussed. Here again, in this embodiment, portions duplicating the corresponding portions of other embodiments are numbered the same as a matter of convenience and for clarity. In this microwave radiometric mapping system 10", the output of power detector 14 is passed as an input to an analog to digital converter 26 in order that the output of power detector 14 may be converted to an appropriate input for computer 27. While a magnetic storage unit 28 is in the signal path between analog to digital converter 26 and computer 27 the system would work without such a unit. Conversely, a magnetic information storage unit 28 may be employed for recording information, for example, at a different time and a different location with information sensed from a ground scene and processed through the system to the magnetic information storage unit 28. At another time, the magnetic information storage unit 28 may be connected to computer 27 for processing through the remainder of the system and ultimately producing either an output such as the resultant map 19" or a readout in another form such as in a numerical readout table form.

Computer 27, including an internal information storage section 29, is supplied with an additional spatial filter form input, from spatial filter form information source 30. This spatial filter form input continually coacts with the input from analog to digital converter 26 or, in the same form, from the magnetic information storage unit 28 at a later time, throughout the time interval of each map scene scanning frame as determined by computer pre-programming and/or by scan control drive triggering for individual frame scan sequences. The output of computer 29 from the information stored, each and every portion of which is subject to development and change throughout every timed scan frame input sequence, after each scanned frame input sequence is complete is applied as a scan frame timed input to digital to analog converter 31. A resulting output in analog form from converter 31 is applied as a voltage signal input to image projecting means 32 that may be a cathode ray tube ultimately producing map 19″ on its viewing screen. Each scanned frame output sequence from computer 27 activates an additional output from the digital to analog converter 31 to output scan drive control device 33 which responds by providing output drive control through connecting drive 34. This output drive control would be the deflection voltage signal control for a cathode ray tube 32 or a scan drive were a projected modulated beam and map printing system employed. Obviously, scan control drive 35 connected through drive line 36 to antenna 12 must drive the sensing antenna 12 through respective ground scene sensing frames compatible with computer information processing and with the output scan drive control 33. Further, the spatial filter form information source 30 of this embodiment may be such as to include both positive function and negative function information that is continually applied and combined in the computer to the information input to the computer 27 throughout each respective scan frame operational sequence.

Whereas, this invention is here illustrated and described with respect to several embodiments thereof, it should be realized that various changes may be made without departing from essential contributions to the art made by the teachings hereof.

We claim:
1. In a passive radio frequency scene detection and reproducing system including a scene scan detection device that imparts a smoothing filtering action function to scan scene signals sensed and passed by the scene detection device; RF amplifying means connected for receiving signals from the scene detection device and providing an amplified output; a power detector connected to the output of said RF amplifying means; readout portraying means; and postdetection spatial filtering means interspersed between said power detector and said readout portraying means.

2. The passive radio frequency scene detection and reproducing system of claim 1, wherein said postdetection spatial filtering means includes, light generating means for transducing the detected electrical energy output of said power detector to light energy for map recording on said readout portraying means; light shaping and directing means for the light energy produced; scan control drive means for said light generating means and said light shaping and directing means; scan control and drive means for said scene detection device; and spatial filter transparency means positioned between said light shaping and directing means and said readout portraying means.

3. The postdetection spatial filtering means of claim 2, wherein the filter means has positive function filter characteristics for adding density in the map recording imparted to the readout portraying means.

4. The postdetection spatial filtering means of claim 3, wherein the filter transparency has a concentric series of opaque rings positioned to impose image adding density effects to colineated shaped and directed light from said light generating means.

5. The postdetection spatial filtering means of claim 2, wherein the filter means has negative function filter characteristics for reducing density in the map recording imparted to the readout portraying means.

6. The postdetection spatial filtering means of claim 5, wherein the filter transparency has a concentric series of opaque rings postioned to impose image reducing density effects to colineated shaped and directed light from said light generating means.

7. The postdetection spatial filtering means of claim 2, wherein the filter means includes both positive function map print density adding and negative function map print density reducing filter capabilities for varying density in the map recording imparted to the readout portraying means.

8. The postdetection spatial filtering means of claim 7, wherein said filter transparency means includes a concentric series of spaced opaque rings having a positive function filter effect; and includes a concentric series of spaced opaque rings having a negative function filter effect; and time delay means in the system having positive function and negative function filter additive integrating characteristics providing a tradeoff control between noise, sensed and internal to the system, and resolution.

9. The postdetection spatial filter means of claim 2, wherein said readout portraying means has time delay image integrating characteristics.

10. The postdetection spatial filter means of claim 9, wherein said readout portraying means is a film sheet of photosensitive emulsion.

11. The postdetection spatial filter means of claim 10, wherein the filtering system is a bipolar postdetection spatial filtering system and the readout portraying means is Herschel effect film.

12. The postdetection spatial filter means of claim 11, wherein said light generating means includes both a blue zone white light generating source and a yellow light generating source.

13. The passive radio frequency scene detection and reproducing system of claim 1, wherein the output of said power detector is connected to an input of a computer system having an information storage section; spatial filter form signal source means connected for feeding spatial filter form signal information as an additional input to said computer system; and means for conveying the output from said computer by respective scan frame sequences to said readout portraying means.

14. The passive radio frequency scene detection and reproducing system of claim 13, wherein the filter means includes positive function and negative function recording density controlling filter function characteristics for tradeoff control between noise and resolution in the recording imparted to the readout portraying means.

15. The passive radio frequency scene detection and reproducing system of claim 14, wherein the readout portraying means is a cathode ray tube having a viewing screen with time delay image integrating characteristics.

16. The passive radio frequency scene detection and reproducing system of claim 13, wherein a magnetic information storage unit is included in the system between said power detector and the input to said computer system with the capability for storing information sensed from a scene and detected in the system for later playout from the magnetic information storage unit at a different time and place as desired as the information input to the computer of the system and development of the readout ultimately presented at the readout portraying means.

17. The passive radio frequency scene detection and reproducing system of claim 16, wherein a first scan control drive is provided for said scene detection device; and a second scan control drive is provided for scan control and timing of the computer output signal for readout as presented by said readout portraying means.

18. The passive radio frequency scene detection and reproducing system of claim 17, wherein said power detector is a square law detector; an analog to digital converter is included in the system between said square law detector and the computer; and including a digital to analog converter between said computer and said readout portraying means.

References Cited
UNITED STATES PATENTS
| | | | |
|---|---|---|---|
| 2,959,105 | 11/1960 | Sayanagi | 88—106 |
| 3,045,530 | 7/1962 | Tsujiuchi | 88—14 |
| 3,090,281 | 5/1963 | Marechal et al. | 88—24 |
| 3,370,268 | 2/1968 | Dobrin et al. | 340—15.5 |

OTHER REFERENCES

Pamphlet: "Velocity and Frequency Filtering of Seismic Data Using Laser Light," by Dobrin, Ingalls, and Long, received in U.S. Pat. Office Aug. 25, 1965, pp. 1–16, 28–31.

Article: "Fourier Treatment of Optical Processes," by Peter Elias et al., from Journal of the Optical Society of America, vol. 42, No. 2, February 1952, pp. 127–134.

ROBERT L. GRIFFIN, Primary Examiner

R. K. ECKERT, Jr., Assistant Examiner

U.S. Cl. X.R.

325—65; 343—909; 350—314